United States Patent
Sato et al.

(10) Patent No.: US 11,298,858 B2
(45) Date of Patent: Apr. 12, 2022

(54) METHOD FOR MANUFACTURING SEALING DEVICE, AND SEALING DEVICE

(71) Applicant: NOK CORPORATION, Tokyo (JP)

(72) Inventors: Hiroaki Sato, Aso (JP); Akira Morio, Aso (JP); Daihachi Shojima, Aso (JP)

(73) Assignee: NOK CORPORATION, Tokyo (JP)

( * ) Notice: Subject to any disclaimer, the term of this patent is extended or adjusted under 35 U.S.C. 154(b) by 288 days.

(21) Appl. No.: 16/353,618

(22) Filed: Mar. 14, 2019

(65) Prior Publication Data
US 2019/0210257 A1   Jul. 11, 2019

Related U.S. Application Data

(62) Division of application No. 14/438,708, filed as application No. PCT/JP2013/052252 on Jan. 31, 2013, now Pat. No. 10,279,518.

(30) Foreign Application Priority Data

Oct. 30, 2012  (JP) ................. 2012-238900

(51) Int. Cl.
*F16J 15/02* (2006.01)
*B29C 45/00* (2006.01)
(Continued)

(52) U.S. Cl.
CPC ......... *B29C 45/0053* (2013.01); *F16J 15/108* (2013.01); *F16J 15/3204* (2013.01);
(Continued)

(58) Field of Classification Search
CPC ...... F16J 15/108; F16J 15/3204; F16J 15/328; F16J 15/56; B29C 45/0053;
(Continued)

(56) References Cited

U.S. PATENT DOCUMENTS 3,813,197 A   5/1974   Ray et al.
4,000,240 A   12/1976  Green et al.
(Continued)

FOREIGN PATENT DOCUMENTS

DE   3807245 A1   9/1989
DE   202011105527 U1   1/2012
(Continued)

OTHER PUBLICATIONS

Chinese Office Action dated Jan. 12, 2016 wiIth English translation.
(Continued)

*Primary Examiner* — Gilbert Y Lee
(74) *Attorney, Agent, or Firm* — Harness, Dickey & Pierce, P.L.C.

(57) ABSTRACT

A method for manufacturing a sealing device to improve the positioning accuracy of a parting operation while also improving manufacturing efficiency. The method includes molding an elastomeric cylindrical molded body (100a) with a plurality of cylindrical surface portions (130) and a plurality of annular outer peripheral convex portions (110) arranged alternately on an outer peripheral side thereof, and further provided with a plurality of cylindrical surface portions and a plurality of annular inner peripheral convex portions arranged alternately on an inner peripheral side thereof. The cylindrical surface portions on the outer peripheral side and the cylindrical surface portions on the inner peripheral side, as well as the outer peripheral convex portions and the inner peripheral convex portions are provided so as to be at the same positions in the axial direction.

2 Claims, 11 Drawing Sheets

(51) Int. Cl.
*F16J 15/3204* (2016.01)
*F16J 15/328* (2016.01)
*F16J 15/56* (2006.01)
*F16J 15/10* (2006.01)
*B29K 101/00* (2006.01)
*B29L 31/26* (2006.01)

(52) U.S. Cl.
CPC .............. *F16J 15/328* (2013.01); *F16J 15/56* (2013.01); *B29C 2793/009* (2013.01); *B29C 2793/0027* (2013.01); *B29K 2101/00* (2013.01); *B29L 2031/265* (2013.01)

(58) Field of Classification Search
CPC ...... B29C 2793/0027; B29C 2793/009; B29K 2101/00; B29L 2031/265
See application file for complete search history.

(56) References Cited

U.S. PATENT DOCUMENTS

| | | | |
|---|---|---|---|
| 4,052,112 A | 10/1977 | Faber | |
| 4,336,946 A * | 6/1982 | Wheeler | F16J 15/32 277/529 |
| 5,262,115 A | 11/1993 | Tomlinson | |
| 5,445,395 A * | 8/1995 | Combot-Courrau | F16L 21/03 277/625 |
| 2010/0096033 A1 | 4/2010 | Yoshimura | |
| 2011/0285095 A1 | 11/2011 | Okuma et al. | |

FOREIGN PATENT DOCUMENTS

| | | |
|---|---|---|
| JP | S38-018518 | 9/1963 |
| JP | 58-069155 | 5/1983 |
| JP | S60-141779 U | 9/1985 |
| JP | H05-022947 U | 3/1993 |
| JP | 09-222169 | 8/1997 |
| JP | 2794568 B2 | 9/1998 |
| JP | 2002-195417 A | 7/2002 |
| JP | 2006-177460 A | 7/2006 |
| JP | 2006-308002 A | 11/2006 |
| JP | 2007-092911 A | 4/2007 |
| JP | 2009-191920 A | 8/2009 |
| JP | 2010-101341 A | 5/2010 |
| JP | 2011-027127 A | 2/2011 |
| JP | 2011-241914 A | 12/2011 |

OTHER PUBLICATIONS

Korean Office Action dated Apr. 11, 2016 with English partial translation.
Extended European search report dated May 27, 2016.
Japanese Office Action dated Jun. 14, 2016 with English translation.
Japanese Office Action dated Dec. 6, 2016 with English translation.
Japanese Office Action dated May 30, 2017 with English translation.
European Communication Pursuant to Article 94(3) EPC dated Jun. 8, 2017.

* cited by examiner

METHOD FOR MANUFACTURING SEALING DEVICE, AND SEALING DEVICE

CROSS-REFERENCE TO RELATED APPLICATIONS

This application is a divisional of U.S. patent application Ser. No. 14/438,708, filed Apr. 27, 2015 (now U.S. Pat. No. 10,279,518), which is a National Stage of International Application No. PCT/JP2013/052252, filed Jan. 31, 2013 (now WO 2014/068999A1), which claims priority to Japanese Application No. 2012-238900, filed Oct. 30, 2012. The entire disclosures of each of the above applications are incorporated herein by reference.

FIELD

The present disclosure relates to a method for manufacturing a sealing device that seals an annular gap between two members configured to be reciprocally movable relative to each other, and relates to a sealing device itself.

BACKGROUND

Conventionally, there has been known an elastomeric sealing device that seals an annular gap between two members configured to be reciprocally movable relative to each other. Such a sealing device is used in such a manner that it is fitted in an annular fitting groove formed on one of the two members so that it slides on the other member. As examples of such a sealing device, a so-called D ring having a D-shaped cross section and a rectangular ring having a rectangular cross section with an annular convex portion formed on its sliding side are known (refer to a first patent literature).

In such sealing devices, especially in cases where a sealing device has a large inside diameter, in terms of cost or manufacturing efficiency, it is advantageous to manufacture individual sealing devices by conducting a parting operation to one molded body, rather than molding individual sealing devices separately.

However, in the case of a sealing device in which an annular convex portion is formed on an inner peripheral side thereof, when the above-mentioned parting operation is to be conducted, it is difficult to recognize the position of the annular convex portion. Therefore, there is a problem that it is difficult to achieve a high positioning accuracy of the parting operation (refer to a second patent literature).

In addition, in the case of a sealing device such as a D ring mentioned above, there is also a disadvantage that its sliding resistance tends to become high because the main body portion of the sealing device is constrained in the fitting groove and thereby making it difficult for the ring to deform.

CITATION LIST

Patent Literature

First Patent Literature: Japanese patent application laid-open No. H9-222169 Second Patent Literature: Japanese patent No. 2794568

SUMMARY

Technical Problem

The object of the present disclosure is to provide a method for manufacturing a sealing device which makes it possible to improve the positioning accuracy of a parting operation while also improving manufacturing efficiency, even if the sealing device has an annular inner peripheral convex portion on its inner peripheral side, and to further provide a sealing device that is capable of achieving a better sliding property and suppressing a breakage thereof.

Solution to Problem

In order to solve the above-mentioned problems, the present disclosure adopts the following means.

That is, a method for manufacturing a sealing device, the sealing device is an elastomeric sealing device that is fitted in an annular fitting groove formed on one of two members so as to seal an annular gap between the two members, the two members configured to be reciprocally movable relative to each other, characterized by including: conducting a process for molding an elastomeric cylindrical molded body that is provided with a plurality of cylindrical surface portions and a plurality of annular outer peripheral convex portions arranged alternately on an outer peripheral side thereof, and further provided with a plurality of cylindrical surface portions and a plurality of annular inner peripheral convex portions arranged alternately on an inner peripheral side thereof, wherein the cylindrical surface portions on the outer peripheral side and the cylindrical surface portions on the inner peripheral side are provided so as to be at the same positions in an axial direction, and the outer peripheral convex portions and the inner peripheral convex portions are also provided so as to be at the same positions in the axial direction; and conducting a process for conducting a parting operation to the molded body along the individual cylindrical surface portions on the outer peripheral side.

According to the present disclosure, a plurality of sealing devices can be obtained from one molded body by conducting the parting operation to the cylindrical molded body. Accordingly, the manufacturing efficiency can be improved when compared with the case where individual sealing devices are molded separately. In addition, upon conducting, the parting operation can be conducted along the individual cylindrical surface portions on the outer peripheral side, so that the positioning thereof becomes easy, and hence the positional accuracy of the parting operation can be improved. Therefore, even in the case of the sealing device which requires the annular inner peripheral convex portions on the inner peripheral side thereof, it is possible to improve the positioning accuracy of the parting operation.

In addition, a sealing device according to the present disclosure is a sealing device, that is an elastomeric sealing device and is fitted in an annular fitting groove formed on one of two members configured to be reciprocally movable relative to each other, so as to seal an annular gap between these two members, characterized in that: on an outer peripheral side thereof, an annular outer peripheral convex portion; and cylindrical surface portions provided on both sides of the outer peripheral convex portion are formed; and on an inner peripheral side thereof, an annular inner peripheral convex portion; and cylindrical surface portions provided on both sides of the inner peripheral convex portion are formed.

According to the present disclosure, since the annular convex portions are formed on both the outer peripheral side and the inner peripheral side, the sealing device can be applied to both outer peripheral side sliding usage and inner peripheral side sliding usage. In addition, due to the fact that a reaction force against the compression of the sealing device in a radial direction can be suppressed, in combination with the fact that the sealing device can be easily deformed within the fitting groove, it is possible to reduce the sliding resistance of the sealing device in a synergetic manner.

Advantageous Effects of Disclosure

As described above, according to the method for manufacturing a sealing device according to the present disclosure, it is possible to improve the positioning accuracy of a parting operation while also improving the manufacturing efficiency, even if the sealing device has an annular inner peripheral convex portion on its inner peripheral side. In addition, according to the sealing device of the present disclosure, a better sliding property can be achieved and a breakage thereof can be suppressed.

DRAWINGS

DETAILED DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

First Example

With reference to FIGS. 1 to 10, a sealing device and a method for manufacturing the sealing device according to a first example of the present disclosure will be described. Note that the sealing device according to the present example can be preferably used as a hydraulic seal for reciprocating motions in a transmission system such as an AT (automatic transmission), a CVT (continuously variable transmission) or the like in automobiles. In addition, it can also be used as a seal for reciprocating motions in other general industrial machinery such as construction machinery, agricultural machinery, and so on.

<Sealing Device>

Figure 1:
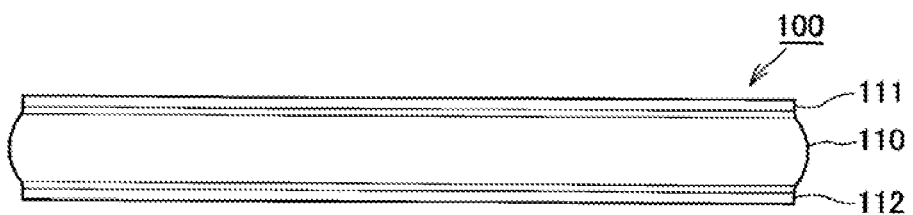
FIG. 1 is a side view of a sealing device according to a first example of the present disclosure.
Figure 2:
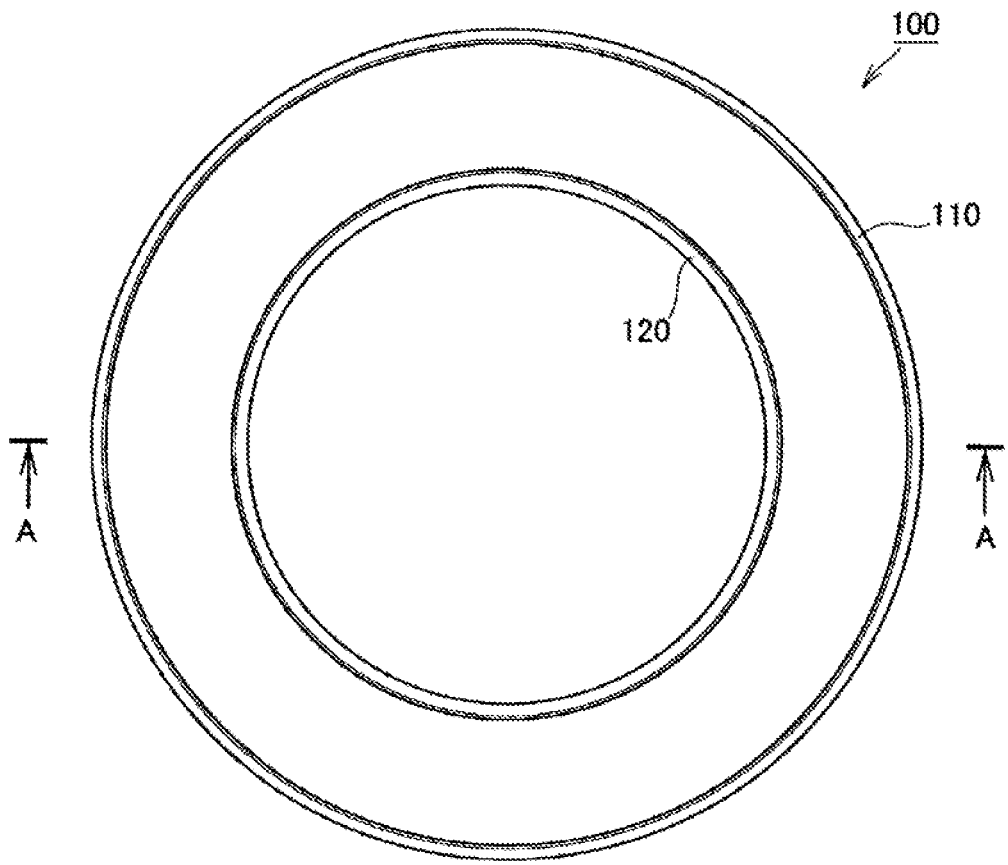
FIG. 2 is a plan view of the sealing device according to the first example of the present disclosure.
Figure 3:
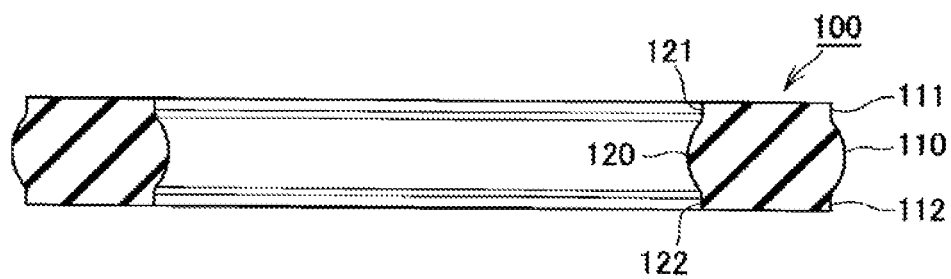
FIG. 3 is a cross sectional view of the sealing device according to the first example of the present disclosure.

With reference to FIGS. 1 to 3, a sealing device according to the first example of the present disclosure will be described. FIG. 1 is a side elevation view of the sealing device according to the first example of the present disclosure. FIG. 2 is a plan view of the sealing device according to the first example of the present disclosure. FIG. 3 is a cross sectional view (A-A cross sectional view in FIG. 2) of the sealing device according to the first example of the present disclosure.

The sealing device 100 according to the present example is an elastomeric annular member. On an outer peripheral side of the sealing device 100, an annular outer peripheral convex portion 110, and cylindrical surface portions 111, 112 provided on both sides of the outer peripheral convex portion 110 are formed. Moreover, on an inner peripheral side of the sealing device 100, an annular inner peripheral convex portion 120 and cylindrical surface portions 121, 122 provided on both sides of the inner peripheral convex portion 120 are formed.

Here, in the present example, the shapes and dimensions of the cross sections of the outer peripheral convex portion 110 and the inner peripheral convex portion 120 are designed to be the same (refer to FIG. 3). Also, in the present example, the cross sectional shapes at the tips of the outer peripheral convex portion 110 and the inner peripheral convex portion 120 are circular arcs. In addition, the cylindrical surface portions 111, 112 on the outer peripheral side and the cylindrical surface portions 121, 122 on the inner peripheral side are designed so as to be at the same positions, respectively, in an axial direction. Moreover, the outer peripheral convex portion 110 and the inner peripheral convex portion 120 are also designed so as to be at the same positions, respectively, in the axial direction. Accordingly, the cross sectional shape of the sealing device 100 is of a symmetrical configuration with respect to a centerline in a radial direction. Note that, as will be described later, due to its demolding property during molding, it is necessary to set the projection height of one of the outer peripheral convex portion 110 and the inner peripheral convex portion 120 to be relatively low, and hence, the projection heights of the outer peripheral convex portion 110 and the inner peripheral convex portion 120 in the present example are set lower in comparison with the cases of other examples to be described later. More specifically, the projection heights of the outer peripheral convex portion 110 and the inner peripheral convex portion 120 (projection heights from the cylindrical surface portions) are set within a range from 0.2 mm to 0.4 mm, inclusive. Thus, the demolding resistance can be reduced.

<Sealing Structure and Behavior of the Sealing Device>

Figure 4:
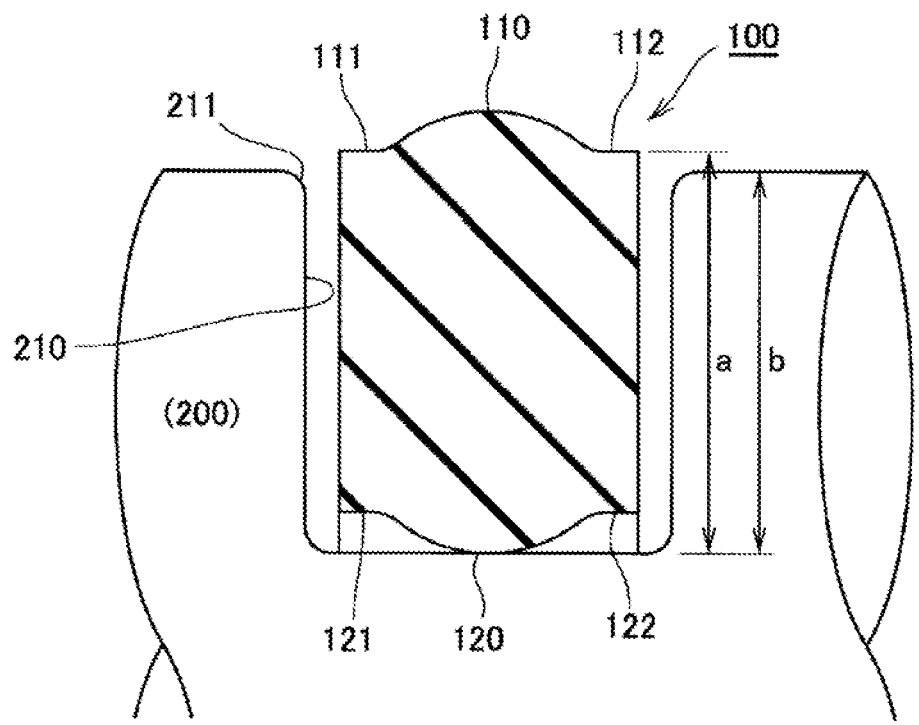
FIG. 4 is a schematic cross sectional view showing a fitted state of the sealing device according to the first example of the present disclosure when fitted in a fitting groove.
Figure 5:
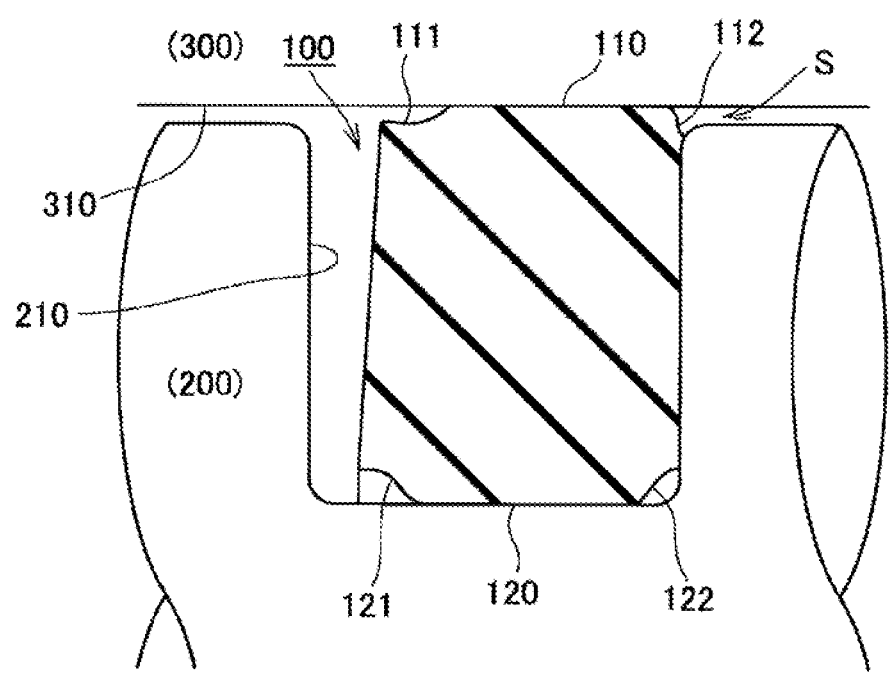
FIG. 5 is a schematic cross sectional view showing usage state of the sealing device according to the first example of the present disclosure.

With reference especially to FIGS. 4 and 5, a sealing structure employing the sealing device 100 according to the present example and the behavior of the sealing device 100 will be described.

The sealing device according to the present disclosure is fitted in an annular fitting groove formed in one of two members configured to be reciprocally movable relative to each other, so as to seal an annular gap between these two members. In the following, as an example thereof, among a shaft 200 and a housing 300 that are configured to be reciprocally movable relative to each other, there is shown the case of the sealing device 100 which is used so as to be fitted in an annular fitting groove 210 formed on the shaft 200. FIG. 4 is a schematic cross sectional view showing a state where the sealing device 100 according to the present example of the present disclosure is fitted in the annular groove 210, and FIG. 5 is a schematic cross sectional view showing usage state of the sealing device 100 according to the present example of the present disclosure.

As mentioned above, in the case of the sealing device 100 according to the present example, the projection height of the outer peripheral convex portion 110 is set to be relatively low. For this reason, the cylindrical surface portions 111, 112 on the outer peripheral side of the sealing device 100 are set so as to protrude from the fitting groove 210 so that the outer peripheral convex portion 110 can slide on an inner peripheral surface of a shaft hole 310 in the housing 300 in a more reliable manner. That is, as shown in FIG. 4, in a state where the sealing device 100 is fitted in the fitting groove 210, a distance "a" from a groove bottom surface to the cylindrical surface portions 111, 112 is set to be longer than a depth "b" of the fitting groove 210. In addition, in order to prevent edge portions of the ends of the cylindrical surface portions 111, 112 from being bitten into a minute annular gap S outside the fitting groove 210 and between the shaft 200 and the housing 300, due to the fact that the cylindrical surface portions 111, 112 are set to protrude from the fitting groove 210, relatively large chamfers 211 are formed between each of the side surfaces of the fitting groove 210 and the surface of the shaft 200.

When the shaft 200 and the housing 300 reciprocally move relative to each other, the outer peripheral convex portion 110 on the sealing device 100 deforms when being dragged by the inner peripheral surface of the shaft hole 310 of the housing 300. In addition, in the case of the sealing device 100 according to the present example, because the inner peripheral convex portion 120 is also formed on a groove bottom side of the fitting groove 210, spaces are formed between the cylindrical surface portions 121, 122 on the both sides of the inner peripheral convex portion 120 and the groove bottom of the fitting groove 210, respectively. Accordingly, the constraining force is reduced by the extent of the proportion of the above-mentioned spaces, so that when the shaft 200 and the housing 300 reciprocally move relative to each other, the sealing device 100 also deforms within the fitting groove 210.

Note that in FIG. 5, there is shown a state where the housing 300 is moving relatively to the right side in the drawing with respect to the shaft 200. In this state, the sealing device 100 deforms so as to be dragged to the right side in the drawing by the inner peripheral surface of the shaft hole 310, while deforming within the fitting groove 210, as well.

<Advantages of the Sealing Device According to the Present Example>

According to the sealing device 100 of the present example, the annular convex portions (the outer peripheral convex portion 110 and the inner peripheral convex portion 120) are formed on both the outer peripheral side and the inner peripheral side. Accordingly, the sealing device 100 can be applied to both outer peripheral side sliding usage and inner peripheral side sliding usage. In other words, as mentioned above, the sealing device can be used not only for usage in which it is fitted in the fitting groove 210 of the shaft 200 so as to allow the outer peripheral convex portion 110 to slide on the inner peripheral surface of the shaft hole in the housing 300, but also for usage in which it is fitted in an annular fitting groove formed on the inner periphery of the shaft hole of the housing so as to allow the inner peripheral convex portion 120 to slide on to the outer peripheral surface of the shaft.

Figure 6:
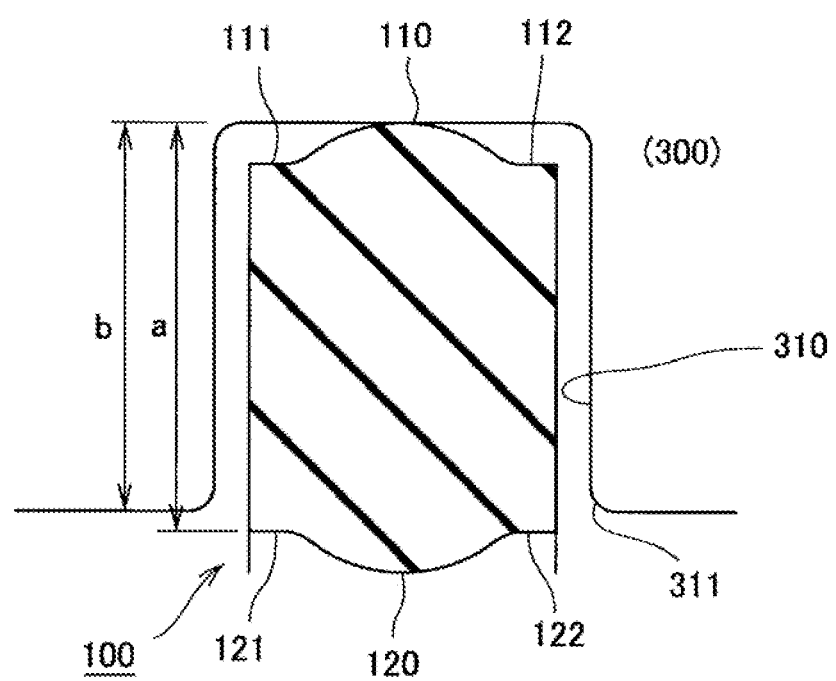
FIG. 6 is a schematic cross sectional view showing a fitted state of the sealing device according to the first example of the present disclosure when fitted in a fitting groove.

A brief description will be given to a case in which the sealing device 100 is used for such usage, while referring to FIG. 6. In an example shown in FIG. 6, the sealing device 100 configured as mentioned above is fitted into an annular fitting groove 310 formed on a housing 300, among a shaft (not shown) and the housing 300 that are configured to be reciprocally movable relative to each other. Note that in this illustrated example, too, in a state where the sealing device 100 is fitted in the fitting groove 310, a distance "a" from a groove bottom surface to the cylindrical surface portions 121, 122 is set to be longer than a depth "b" of the fitting groove 310. It goes without saying that in this illustrated example, too, the same operational effects can be obtained as those in the case where it is used for the above-mentioned usage shown in FIGS. 4 and 5.

In addition, since the annular convex portions (the outer peripheral convex portion 110 and the inner peripheral convex portion 120) are formed on both the outer peripheral side and the inner peripheral side, it is possible to suppress a reaction force against the compression in a radial direction. Moreover, as mentioned above, the constraining force is reduced by the extent of the proportion of the spaces between the cylindrical surface portions 121, 122 on the both sides of the inner peripheral convex portion 120, and the groove bottom of the fitting groove 210, whereby the sealing device 100 can easily deform within the fitting groove 210. In other words, the followability of the sealing device 100 becomes high. With these advantages combined, the sliding resistance can be reduced in a synergetic manner. Accordingly, sliding wear of the sealing device 100 can be suppressed, thereby making it possible to enhance the durability thereof. For example, in cases where the sealing device 100 is used as a hydraulic seal for reciprocating motions in a CVT, even under the condition that strokes of minute widths are generated by a CVT pulley or the like, formation of an oil film on a sliding portion is done in a more reliable manner so that the sliding resistance can be thereby reduced. Note that it goes without saying that even in cases where the sealing device 100 is used for inner peripheral side sliding usage, similar mechanism will apply, and thus it is possible to obtain the similar operational effect.

Moreover, since the cylindrical surface portions 111, 112 are formed on the both sides of the outer peripheral convex portion 110, it is possible to suppress the annular outer peripheral convex portion 110 from protruding into a minute annular gap S in the outside of the fitting groove 210. Note that it goes without saying that even in cases where the sealing device 100 is used for inner peripheral side sliding usage, similar mechanism will apply, and thus it is possible to obtain the similar operational effects.

Further, in the case of the sealing device 100 according to the present example, the shapes and dimensions of the cross sections of the outer peripheral convex portion 110 and the inner peripheral convex portion 120 are designed to be the same, and the cross sectional shapes thereof are of a symmetrical configuration with respect to their centerline in a radial direction. Accordingly, even if the sealing device is used with two sides thereof are turned around, a function equivalent to that in the case where it is used in a normal manner can be obtained.

Note that in the case of the sealing device 100 according to the present example, the projection height of the inner peripheral convex portion 120 is set to be relatively high, as compared with other examples to be described later. For this reason, when compared with the cases of the other examples, the amount of deformation of the sealing device 100 within the fitting groove 210 can be made large, and hence, the followability thereof can be increased.

<Method for Manufacturing the Sealing Device>

With reference to FIGS. 7 to 10, a method for manufacturing the sealing device 100 according to the present example of the present disclosure will be described. In the manufacturing method according to the present example, individual sealing devices are not molded separately, but instead a plurality of sealing devices are obtained from one molded body by first molding the molded body and then conducting the parting operation to this molded body. In the following, a molding process and a parting operation process will be described.

«Molding Process»

Figure 7:
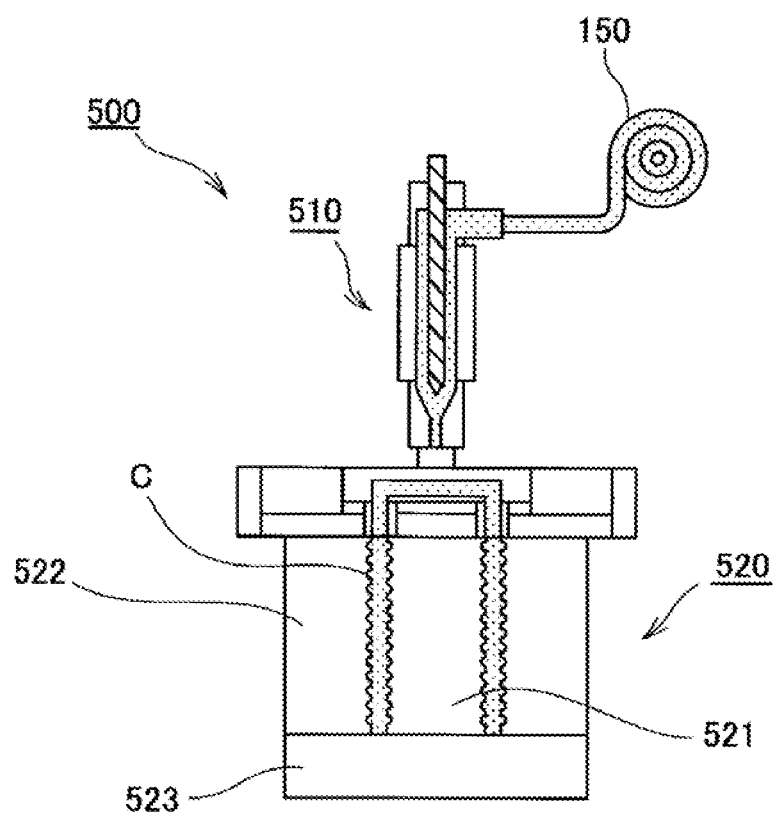
FIG. 7 is an explanatory view explaining a molding process of the sealing device according to the first example of the present disclosure.
Figure 8:
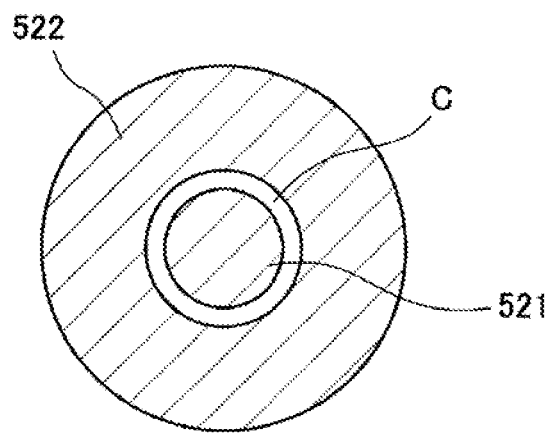
FIG. 8 is a schematic cross sectional view of a mold used in the molding process according to the first example of the present disclosure.
Figure 9:
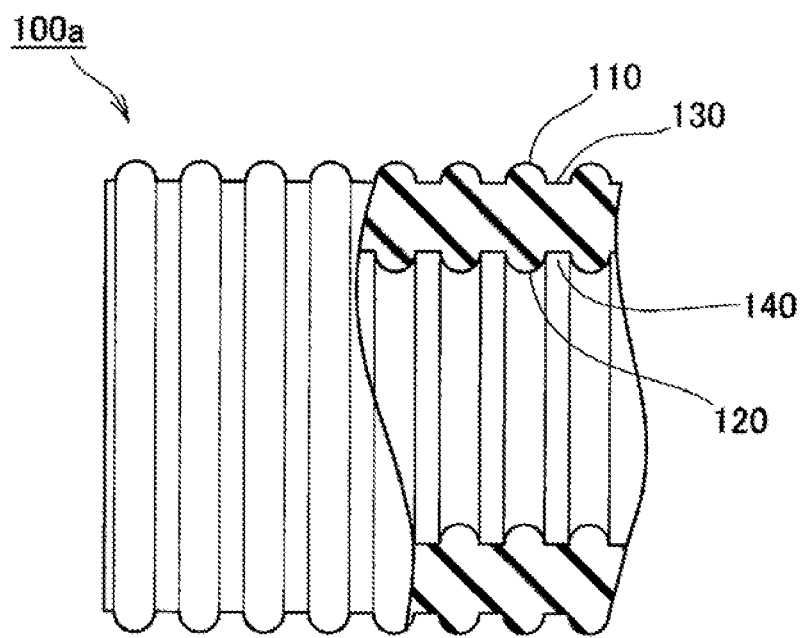
FIG. 9 is a partially broken cross sectional view of a molded body obtained in the molding process according to the first example of the present disclosure.

With reference to FIGS. 7 to 9, the molding process will be described. FIG. 7 is an explanatory view explaining the molding process of the sealing device according to the first example of the present disclosure, and FIG. 8 is a schematic cross sectional view of a mold used in the molding process according to the first example of the present disclosure. Note that in FIG. 7, the whole of a molding device is illustrated cross-sectionally (a vertically intersected cross section), and in FIG. 8, a horizontal cross section of the mold is illustrated. In addition, FIG. 9 is a partially broken cross sectional view of a molded body obtained by the molding process according to the first example of the present disclosure.

In the present example, a molded body 100a is formed by injection molding. As the injection molding is a well-known technique, a detailed explanation thereof is omitted. Note that in the present example, the molded body 100a is formed by a screw type injection molding machine 500. This screw type injection molding machine 500 is roughly composed of an injection mechanism 510 which injects a material 150 while keeping it in a molten state, and a molding mechanism 520 which molds the rubber material in the molten state injected into the interior of a cavity C from the injection mechanism 510. The molding mechanism 520 is provided with an inner mold 521 of a substantially columnar shape, an outer mold 522 of a substantially cylindrical shape, and a lower mold 523 which is disposed at a lower side of these molds.

When molding is conducted, the molten material is injected into the interior of the cavity C by the injection mechanism 510 after clamping of the molds is completed. Then, after the material has solidified and the molds have been cooled, the inner mold 521 is moved in a lower direction in the drawing together with the lower mold 523. At this time, there may be a case where the molded body 100a is held in the inside of the outer mold 522 or a case where the molded body 100a is held on the outside of the inner mold 521 so that it moves together with the inner mold 521 in the lower direction in the drawing. In other words, whether it will be held in the outer mold 522 or on the inner mold 521 is determined according to the relation between the projection height of the outer peripheral convex portion 110 and the projection height of the inner peripheral convex portion 120 in the sealing device 100. In the case of the present example, both of the projection heights are set to be the same, and hence they are held in the outer mold 522, but in the examples to be described later, in cases where the projection height of the inner peripheral convex portion is set to be about several times higher than the projection height of the outer peripheral convex portion, the molded body 100a is held on the outside of the inner mold 521 so that it moves in the lower direction in the drawing together with the inner mold 521.

Then, in the case of the present example, after the inner mold 521 has been moved in the lower direction in the drawing together with the lower mold 523, the molded body 100a in a state of being held inside the outer mold 522, is taken out. Note that it goes without saying that in an example to be described later, in cases where the molded body 100a is held on the inner mold 521, the molded body 100a is removed from the inner mold 521.

The elastomeric cylindrical molded body 100a obtained by the above molding process includes a plurality of cylindrical surface portions 130 and a plurality of annular outer peripheral convex portions 110 arranged alternately on its outer peripheral side and includes a plurality of cylindrical surface portions 140 and a plurality of annular inner peripheral convex portions 120 arranged alternately on its inner peripheral side. In addition, the cylindrical surface portions 130 on the outer peripheral side and the cylindrical surface portions 140 on the inner peripheral side are provided so as to be at the same positions in an axial direction. Moreover, the outer peripheral convex portions 110 and the inner peripheral convex portions 120 are also provided so as to be at the same positions in the axial direction. Note that in order to carry out the parting operation as described below, the widths in the axial direction of the cylindrical surface portions 130, 140 are each set to be equal to or more than 0.2 mm.

«Parting Operation Process»

Figure 10:
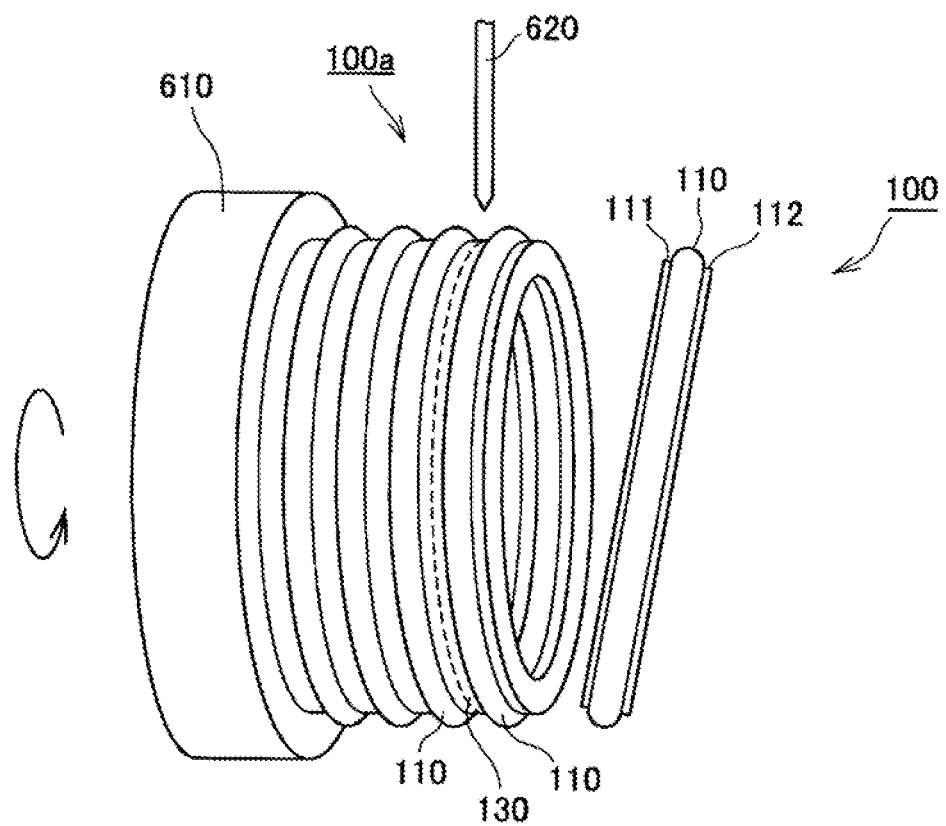
FIG. 10 is an explanatory view explaining a parting operation process according to the first example of the present disclosure.

With reference to FIG. 10, the parting operation process will be explained. FIG. 10 is an explanatory view explaining the parting operation process according to the first example of the present disclosure.

The sealing device 100 can be obtained by cutting the molded body 100a obtained from the above-mentioned molding process with a use of a parting tool 620, while the molded body 100a is in a state where it is mounted on a rotating mechanism 610 and is being rotated by the rotating mechanism 610. Then, by pressing a tip of the parting tool 620 onto a center position of the cylindrical surface portions 130 in the axial direction on the outer peripheral side of the molded body 100a (see a portion indicated by a broken line in FIG. 10), parting operation is done along this position. By conducting such parting operation to all the cylindrical surface portions 130 one after another, a plurality of sealing devices 100 can be obtained from the one molded body 100a.

Note that in order to improve the quality of each sealing device 100 (the molded body 100a) which is a primary vulcanized molded article, it is preferable to perform secondary vulcanization after the parting operation process or before the parting operation process.

<Advantages of the Method for Manufacturing the Sealing Device According to the Present Example>

According to the method for manufacturing the sealing device 100 according to the present example, by conducting the parting operation on the cylindrical molded body 100*a*, the plurality of sealing devices 100 can be obtained from the one molded body 100*a*. Accordingly, manufacturing efficiency can be improved in comparison with the case where individual sealing devices are molded separately. In addition, upon conducting the parting operation, it can be conducted along the center position of each of the cylindrical surface portions 130 in the axial direction on the outer peripheral side of the molded body 100*a* so that the positioning thereof becomes easy, and the positional accuracy of the parting operation can be improved. Accordingly, even in the case of the sealing device 100 which requires the annular inner peripheral convex portions 120 on the inner peripheral side thereof, there is no need to confirm the positions of the inner peripheral convex portions 120, and hence it becomes possible to improve the positional accuracy of the parting operation. Note that in the present example, the lengths of the cylindrical surface portions 111, 112 in the axial direction provided on the both sides of the outer peripheral convex portion 110, and the lengths of the cylindrical surface portions 121, 122 in the axial direction provided on the both sides of the inner peripheral convex portion 120 are set to be the same. For this reason, the case where the parting operation is conducted along the center position in the axial direction of each of the cylindrical surface portions 130 has been described, but it goes without saying that in cases where these lengths are not set to be the same, the parting operation is conducted at a position offset from the center position.

Second Example

Figure 11:
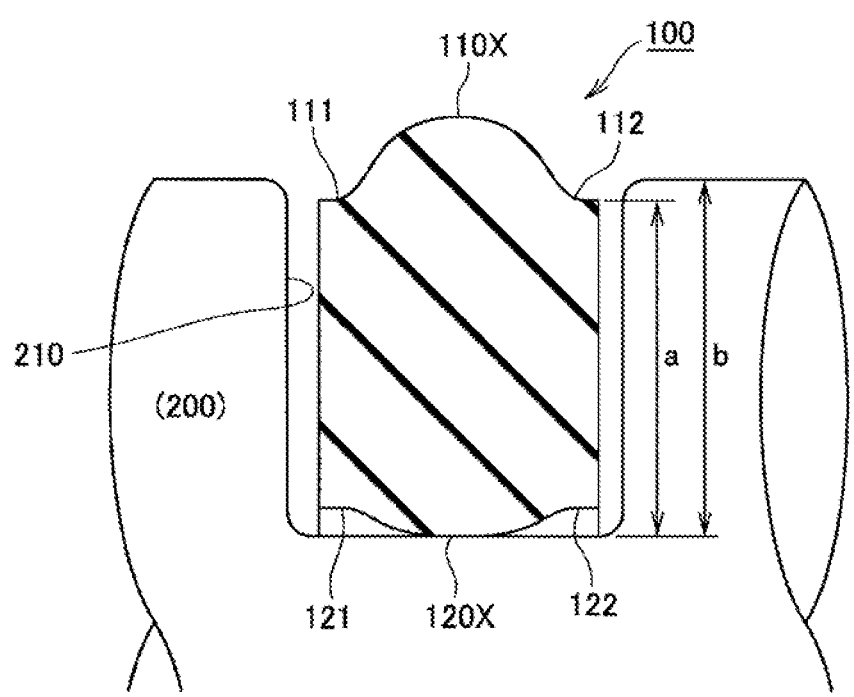
FIG. 11 is a schematic cross sectional view showing a fitted state of a sealing device according to a second example of the present disclosure when fitted in a fitting groove.

A second example of the present disclosure is shown in FIG. 11. In the above-mentioned first example, the projection heights of the outer peripheral convex portion and the inner peripheral convex portion of the sealing device are made equal to each other, but in contrast to this, in the present example, a configuration in which the projection height of an outer peripheral convex portion of a sealing device is set to be higher than the projection height of an inner peripheral convex portion thereof will be described.

Other configurations and operations are the same as those in the above-mentioned first example, and hence, the same component parts as those of the above-mentioned first example are denoted by the same reference signs and the explanations thereof are omitted as appropriate. In addition, a method for manufacturing the sealing device is also the same as in the case of the above-mentioned first example, so the explanation thereof is omitted.

FIG. 11 is a schematic cross sectional view showing a fitted state of the sealing device according to the second example of the present disclosure when fitted in a fitting groove. As mentioned above, in the molding process in the first example, after the material has solidified in the molds, the inner mold 521 is moved in a lower direction in FIG. 7 together with the lower mold 523, in a state where the molded body 100*a* is held inside the outer mold 522. Here, convexes and concaves are formed on the outer periphery of the inner mold 521 and on the inner periphery of the molded body 100*a*, and hence there exists so-called undercuts. Accordingly, the higher the projection height of the inner peripheral convex portion of the molded body 100*a* is set, the larger the demolding resistance becomes. Note that when the molded body 100*a* is taken out from the outer mold 522 after the inner mold 521 has been moved, the molded body 100*a* can elastically deform to the inner side, so the demolding property of the outer peripheral convex portions do not cause much of a problem. With this reason, it is preferred that the projection heights of the inner peripheral convex portions of the molded body 100*a* be made lower in order to improve the demolding property. Note that it goes without saying that the projection heights of the inner peripheral convex portions of the molded body 100*a* and the projection height of the inner peripheral convex portion of the sealing device 100 are equal to each other.

Accordingly, in a sealing device 100 according to the present example, the projection height of an inner peripheral convex portion 120X is set to be relatively low, whereas the projection height of an outer peripheral convex portion 110X is set to be relatively high. More specifically, the projection height of the inner peripheral convex portion 120X (the projection height from cylindrical surface portions 121, 122) is set within a range from 0.1 mm to 0.3 mm, inclusive, whereas the projection height of the outer peripheral convex portion 110X (the projection height from cylindrical surface portions 111, 112) is set within a range from 0.4 mm to 0.8 mm, inclusive.

In the case of the sealing device 100 according to the present example configured as above, the similar operational effects as those in the case of the sealing device 100 according to the above-mentioned first example can be obtained, as well. Note that the sealing device 100 according to the present example can be preferably used for usage in which it is fitted in a fitting groove 210 of a shaft 200 so as to allow the outer peripheral convex portion 110X to slide on an inner peripheral surface of a shaft hole in a housing. In the case of the present example, the projection height of the inner peripheral convex portion 120X is lower in comparison with that in the first example, and hence, the demolding property is superior than the case of the first example.

In addition, in the case of the present example, the projection height of the outer peripheral convex portion 110X is set to be relatively high, and hence, it becomes possible to set a distance "a" from a groove bottom surface to the cylindrical surface portions 111, 112 to be shorter than depth "b" of the fitting groove 210, when the sealing device 100 is in a state where it is fitted in the fitting groove 210.

As described, by setting the above-mentioned distance "a" to be shorter than the depth "b", it is possible to suppress the edge portions of the ends of the cylindrical surface portions 111, 112 from interfering with the corner portions of the fitting groove 210 and thereby being damaged. As a result, there is no need to form relatively large chamfers 211 between the side surfaces of the fitting groove 210 and the surface of the shaft 200.

Third Example

Figure 12:
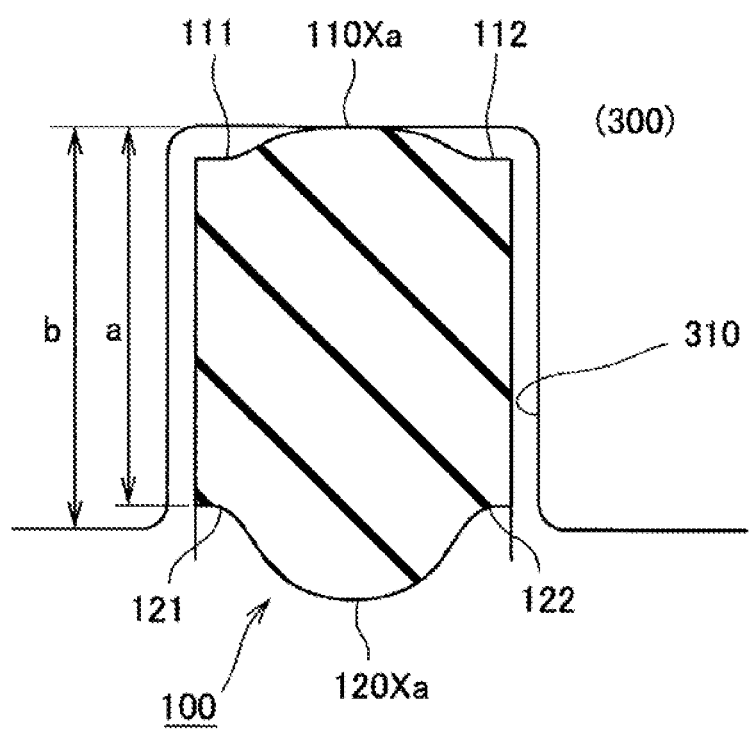
FIG. 12 is a schematic cross sectional view showing a fitted state of a sealing device according to a third example of the present disclosure when fitted in a fitting groove.

A third example of the present disclosure is shown in FIG. 12. In the above-mentioned first example, the projection heights of the outer peripheral convex portion and the inner peripheral convex portion of the sealing device are made equal to each other, but in contrast to this, in the present example, a configuration in which the projection height of an inner peripheral convex portion of a sealing device is set to be higher than the projection height of an outer peripheral convex portion thereof will be described.

Other configurations and operations are the same as those in the above-mentioned first example, and hence, the same component parts as those of the above-mentioned first example are denoted by the same reference signs and the explanations thereof are omitted as appropriate. In addition, a method for manufacturing the sealing device is also the same as in the case of the above-mentioned first example except for a point that a molded body is held not in an outer mold but on an inner mold at the time of demolding, and hence, the explanation thereof is omitted as appropriate.

FIG. 12 is a schematic cross sectional view showing a fitted state of the sealing device according to the third example of the present disclosure when fitted in a fitting groove. In a sealing device 100 according to the present example, the projection height of an inner peripheral convex portion 120Xa is set to be relatively high, whereas the projection height of an outer peripheral convex portion 110Xa is set to be relatively low. More specifically, the projection height of the inner peripheral convex portion 120Xa (the projection height from cylindrical surface portions 121, 122) is set within a range from 0.4 mm to 0.8 mm, inclusive, and the projection height of the outer peripheral convex portion 110Xa (the projection height from cylindrical surface portions 111, 112) are set within a range from 0.1 mm to 0.3 mm, inclusive.

In a molding process in the present example, when an inner mold 521 is moved in a lower direction in FIG. 7 together with a lower mold 523, after a material has solidified in the molds, a molded body 100a is being held on the inner mold 521 and hence it is moved in the lower direction together with the lower mold 523. Here, convexes and concaves are formed on the inner periphery of the outer mold 522 and on the outer periphery of the molded body 100a, and hence there exists so-called undercuts. However, in the present example, because the projection height of the outer peripheral convex portion 110Xa of the sealing device 100 is set to be relatively low (the projection heights of the outer peripheral convex portions of the molded body 100a are set to be relatively low), it is possible to reduce the demolding resistance. Note that when the molded body 100a is removed from the inner mold 521, the molded body 100a can be elastically deformed to an outer side, so the demolding property of the inner peripheral convex portion does not cause much of a problem.

In the case of the sealing device 100 according to the present example configured as above, the same operational effects as in the case of the sealing device 100 according to the above-mentioned first example can be obtained, as well. Note that the sealing device 100 according to the present example can be preferably used for usage in which it is fitted in an annular fitting groove 310 formed on an inner periphery of a shaft hole 310 in a housing 300 so as to allow the inner peripheral convex portion 120Xa to slide on an outer peripheral surface of a shaft.

In addition, in the case of the present example, too, the projection height of the inner peripheral convex portion 120Xa is set to be relatively high, and hence, it becomes possible to set a distance "a" from a groove bottom surface to the cylindrical surface portions 121, 122 to be shorter than a depth "b" of the fitting groove 310, when the sealing device 100 is in a state where it is fitted in the fitting groove 310 as in the case of the second example. Accordingly, the same operational effects as in the case of the above-mentioned second example can be obtained.

Fourth Example

Figure 13:
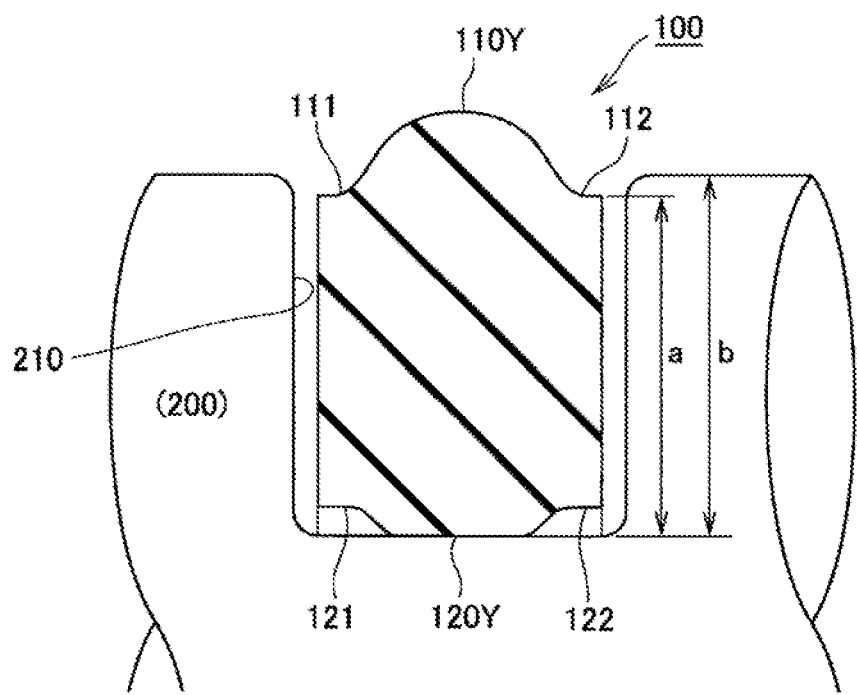
FIG. 13 is a schematic cross sectional view showing a fitted state of a sealing device according to a fourth example of the present disclosure when fitted in a fitting groove.

A fourth example of the present disclosure is shown in FIG. 13. In the above-mentioned first example, the projection heights of the outer peripheral convex portion and the inner peripheral convex portion of the sealing device are made equal to each other, but in contrast to this, in the present example, a configuration in which the projection height of an outer peripheral convex portion of a sealing device is set to be higher than the projection height of an inner peripheral convex portion thereof, and a tip end of the inner peripheral convex portion is formed into a cylindrical surface.

Other configurations and operations are the same as those in the above-mentioned first example, and hence, the same component parts as those of the above-mentioned first example are denoted by the same reference signs, and the explanations thereof are omitted as appropriate. In addition, a method for manufacturing the sealing device according to the present example is also the same as in the case of the above-mentioned first example, so the explanation thereof is omitted.

FIG. 13 is a schematic cross sectional view showing a fitted state of the sealing device according to the fourth example of the present disclosure when fitted in a fitting groove. In a sealing device 100 according to the present example, too, the projection height of an inner peripheral convex portion 120Y is set to be relatively low, whereas the projection height of an outer peripheral convex portion 110Y is set to be relatively high, as in the case of the above-mentioned second example. More specifically, the projection height of the inner peripheral convex portion 120Y (the projection height from cylindrical surface portions 121, 122) is set within a range from 0.1 mm to 0.3 mm, inclusive, and the projection height of the outer peripheral convex portion 110Y (the projection height from cylindrical surface portions 111, 112) is set within a range from 0.4 mm to 0.8 mm, inclusive.

In addition, in the case of the sealing device 100 according to the present example, a tip end of the inner peripheral convex portion 120Y is formed into a cylindrical surface.

Accordingly, in the case of the present example, too, it becomes possible to set a distance "a" from a groove bottom surface to the cylindrical surface portions 111, 112 to be shorter than a depth "b" of a fitting groove 210, when the sealing device 100 is in a state where it is fitted in the fitting groove 210, as in the case of the second example.

In the case of the sealing device 100 according to the present example configured as above, the same operational effects as in the case of the sealing device 100 according to the above-mentioned each example can be obtained, as well.

Moreover, in the case of the sealing device 100 according to the present example, the tip end of the inner peripheral convex portion 120Y is formed into the cylindrical surface, and hence, in cases where it is used for usage in which the sealing device 100 is fitted into the fitting groove 210 formed in a shaft 200, the mounting stability thereof can be improved in comparison with the cases of the above-mentioned first through third examples. However, in comparison with the cases of the above-mentioned first through third examples, the sealing device 100 may become difficult to deform within the fitting groove 210. For this reason, the sliding property of the outer peripheral convex portion 110Y may become lower than that in the cases of the first through third examples.

Fifth Example

Figure 14:
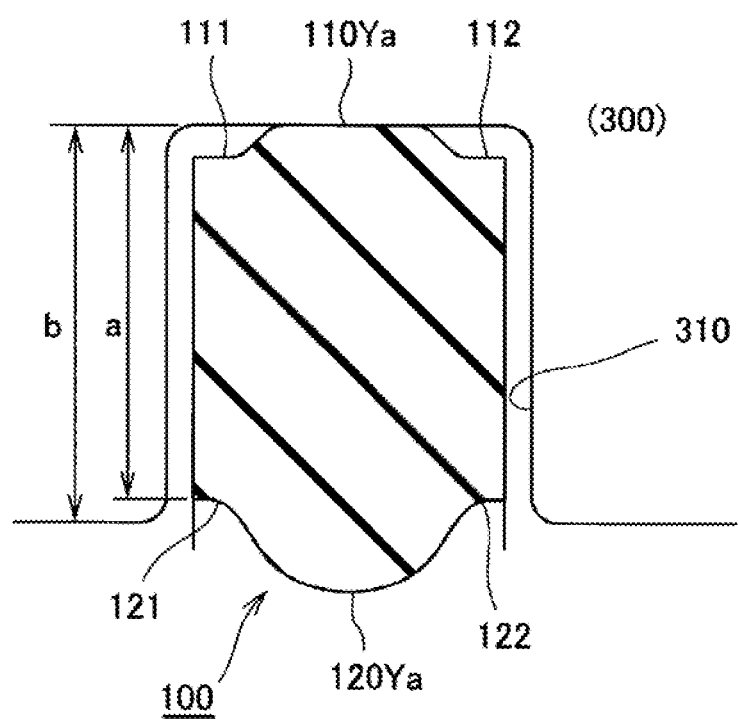
FIG. 14 is a schematic cross sectional view showing a fitted state of a sealing device according to a fifth example of the present disclosure when fitted in a fitting groove.

A fifth example of the present disclosure is shown in FIG. 14. In the above-mentioned first example, the projection heights of the outer peripheral convex portion and the inner peripheral convex portion of the sealing device are made equal to each other, but in contrast to this, in the present example, a configuration in which the projection height of an inner peripheral convex portion of a sealing device is set to be higher than the projection height of an outer peripheral convex portion thereof, and a tip end of the outer peripheral convex portion is formed into a cylindrical surface.

Other configurations and operations are the same as those in the above-mentioned first example, and hence, the same component parts as those of the above-mentioned first example are denoted by the same reference signs and the explanations thereof are omitted as appropriate. In addition, a method for manufacturing the sealing device is also the same as in the case of the above-mentioned first example except for a point that a molded body is held not in an outer mold but on an inner mold at the time of demolding, and hence, the explanation thereof is omitted.

FIG. 14 is a schematic cross sectional view showing a fitted state of the sealing device according to the fifth example of the present disclosure when fitted in a fitting groove. In a sealing device 100 according to the present example, the projection height of an inner peripheral convex portion 120Ya is set to be relatively high, whereas the projection height of an outer peripheral convex portion 110Ya is set to be relatively low. More specifically, the projection height of the inner peripheral convex portion 120Ya (the projection height from cylindrical surface portions 121, 122) is set within a range from 0.4 mm to 0.8 mm, inclusive, and the projection height of the outer peripheral convex portion 110Ya (the projection height from cylindrical surface portions 111, 112) is set within a range from 0.1 mm to 0.3 mm, inclusive. Note that a molding process in the present example is the same as that in the case of the third example.

In the case of the sealing device 100 according to the present example configured as above, too, the same operational effects as in the case of the sealing device 100 according to the above-mentioned each example can be obtained.

In addition, in the case of the sealing device 100 according to the present example, a tip end of the outer peripheral convex portion 110Ya is formed into a cylindrical surface, so that in cases where it is used for usage in which the sealing device 100 is fitted into an annular fitting groove 310 formed in an inner periphery of a shaft hole in a housing 300, the mounting stability thereof can be improved, as in the case of the above-mentioned fourth example.

(Others)

In the above-mentioned molding process, there has been shown the case where injection molding is conducted, but the molded body 100a may be molded by other molding methods. For example, the molded body 100a can also be molded by compression molding. Note that the compression molding is a molding method in which a molding material is placed into a cavity in opened molds, then the molds are closed and heated under high pressure for a certain period of time, thereby causing the material in the molds to solidify, and then the molds are opened and a molded article is taken out therefrom. In addition, the effects of the sealing device 100 itself in each example can be obtained even in cases where each sealing device 100 is molded individually.

REFERENCE SIGNS LIST

100: sealing device
100a: molded body
110, 110X, 110Xa, 110Y, 110Ya: outer peripheral convex portions
111, 112: cylindrical surface portions
120, 120X, 120Xa, 120Y, 120Ya: inner peripheral convex portions
121, 122: cylindrical surface portions
130: cylindrical surface portion
140: cylindrical surface portion
150: material
200: shaft
210: fitting groove
300: housing
310: shaft hole
500: screw type injection molding machine
510: injection mechanism
520: mold mechanism
521: inner mold
522: outer mold
523: lower mold
610: rotating mechanism
620: parting operation tool, C: cavity, S: annular gap

What is claimed is:

1. A sealing device, that is an entirely elastomeric sealing device and is fitted in an annular fitting groove formed on one of two members configured to be reciprocally movable relative to each other, so as to seal an annular gap between these two members, wherein:
   on an outer peripheral side thereof, an annular outer peripheral convex portion; and cylindrical surface portions provided on both sides of the outer peripheral convex portion are formed; and
   on an inner peripheral side thereof, an annular inner peripheral convex portion; and cylindrical surface portions provided on both sides of the inner peripheral convex portion are formed,
   wherein shapes and dimensions of cross sections of the outer peripheral convex portion and the inner peripheral convex portion are the same, and the projection height of the outer peripheral convex portion and the projection height of the inner peripheral convex portion are set within a range from 0.2 mm to 0.4 mm, inclusive.

2. The sealing device as set forth in claim 1, wherein the sealing device includes two flat sidewall surfaces extending between the inner and outer peripheral side thereof,
   the flat sidewall surfaces extends along a majority of a radial thickness of the sealing device, and
   the outer peripheral convex portion and the inner peripheral convex portion extend along a majority of an axial thickness of the sealing device.

* * * * *